United States Patent [19]
Glandon et al.

[11] 4,104,847
[45] Aug. 8, 1978

[54] METHOD AND APPARATUS FOR LOADING ARTICLES INTO CONTAINERS

[75] Inventors: James L. Glandon, Greer; Stanley D. Hall, Taylors, both of S.C.

[73] Assignee: W. R. Grace & Co., Duncan, S.C.

[21] Appl. No.: 718,259

[22] Filed: Aug. 27, 1976

[51] Int. Cl.² .................. B65B 5/04; B65B 67/04
[52] U.S. Cl. ..................... 53/35; 53/187; 53/259; 53/390; 198/631
[58] Field of Search ............ 53/35, 259, 187, 188, 53/189, 390, 391; 198/631, 754, 834

[56] References Cited

U.S. PATENT DOCUMENTS

| | | | |
|---|---|---|---|
| 254,455 | 3/1882 | Burley | 53/259 X |
| 1,521,820 | 1/1925 | Lloyd | 198/631 X |
| 2,110,359 | 3/1938 | Droll et al. | 53/259 X |
| 2,850,855 | 9/1955 | Offutt | 53/35 X |
| 3,106,051 | 10/1963 | Schild | 53/259 |
| 3,254,472 | 6/1966 | Clark et al. | 53/259 |
| 3,307,679 | 3/1967 | Ziegler et al. | 198/631 |
| 3,344,902 | 10/1967 | Crawford | 198/631 X |
| 3,490,195 | 1/1970 | Abramson | 53/189 X |
| 3,505,789 | 4/1970 | McKay | 53/259 |
| 3,942,624 | 3/1976 | Kupcikevicius | 198/37 |

*Primary Examiner*—Horace M. Culver
*Attorney, Agent, or Firm*—John J. Toney; William D. Lee, Jr.; John B. Hardaway

[57] ABSTRACT

Disclosed is a method and apparatus for loading articles, particularly meat articles, into containers. The apparatus comprises a carriage moveably mounted on a platform. The carriage supports conveying means for moving articles relative to the carriage. The carriage and conveying means are operable for movement relative to the platform such that the carriage is moveable into a container where the conveyor means simultaneously conveys and deposits an article within the container.

12 Claims, 5 Drawing Figures

METHOD AND APPARATUS FOR LOADING ARTICLES INTO CONTAINERS

BACKGROUND OF THE INVENTION

The invention disclosed herein relates generally to the art of loading articles into containers and more particularly to a method and apparatus for loading fresh meat articles into flexible plastic containers.

Meat articles have conventionally been manually loaded into flexible plastic packages for either shipment or display. While many aspects of the meat packaging process have been refined to a high degree of automation, the actual step of placing meat articles into containers has remained a substantially manual operation wherein an operator receives a cut of meat from a conveyor, selects an appropriately sized bag and slides the meat from a shelf into the bag. The subsequent processing steps of vacuumizing, clipping and shrinkage are highly automated but remain dependent upon being supplied from a manual container loading step.

An attempt to overcome the shortcomings of the prior art manual handling of meat cuts is described in U.S. Pat. No. 3,942,624 to Kupcikevicius issued Mar. 9, 1976. The apparatus described therein is a bag loading apparatus which comprises a cantilevered conveyor system such that a meat cut may be placed on one end of the conveyor while a bag is draped around the cantilevered end of the conveyor. The movement of the conveyor causes the meat section to move along the conveyor. While this apparatus overcomes many of the shortcomings of the prior art, it necessarily involves the awkward and cumbersome step of manually draping an appropriately sized bag over the end of the cantilevered section. The draping process is particularly burdensome since the bag must have substantially its entire length pulled over the conveyor.

SUMMARY OF THE INVENTION

It is thus an object of this invention to provide a new method and apparatus for conveying and loading articles into containers.

It is a further and more particular object of this invention to provide a method and apparatus for loading fresh meat articles into flexible plastic containers.

It is a still further object of this invention to provide a method and apparatus for loading fresh meat articles into containers wherein an operator has to neither lift nor handle meat.

It is yet another object of this invention to provide a method and apparatus for loading fresh meat articles into containers wherein the required amount of bag handling is at a minimum.

These, as well as other objects, are accomplished by an apparatus having a platform and a carriage moveably mounted on the platform along with conveying means moveable on the carriage. The process is carried out by causing the carriage to move relative to the platform such that the end of the carriage enters and opens a flexible container while the conveying means moves the article across the carriage and into the opened container.

DETAILED DESCRIPTION OF THE DRAWINGS

According to this invention it has been found that an apparatus having in combination, a platform with a carriage moveably mounted thereon together with conveying means moveable on the carriage overcomes the prior art problems associated with non-automation of the actual container loading process. The attendant advantages of such an arrangement will be more readily apparent from the following more particularized description with reference to the drawings.

Figure 1:
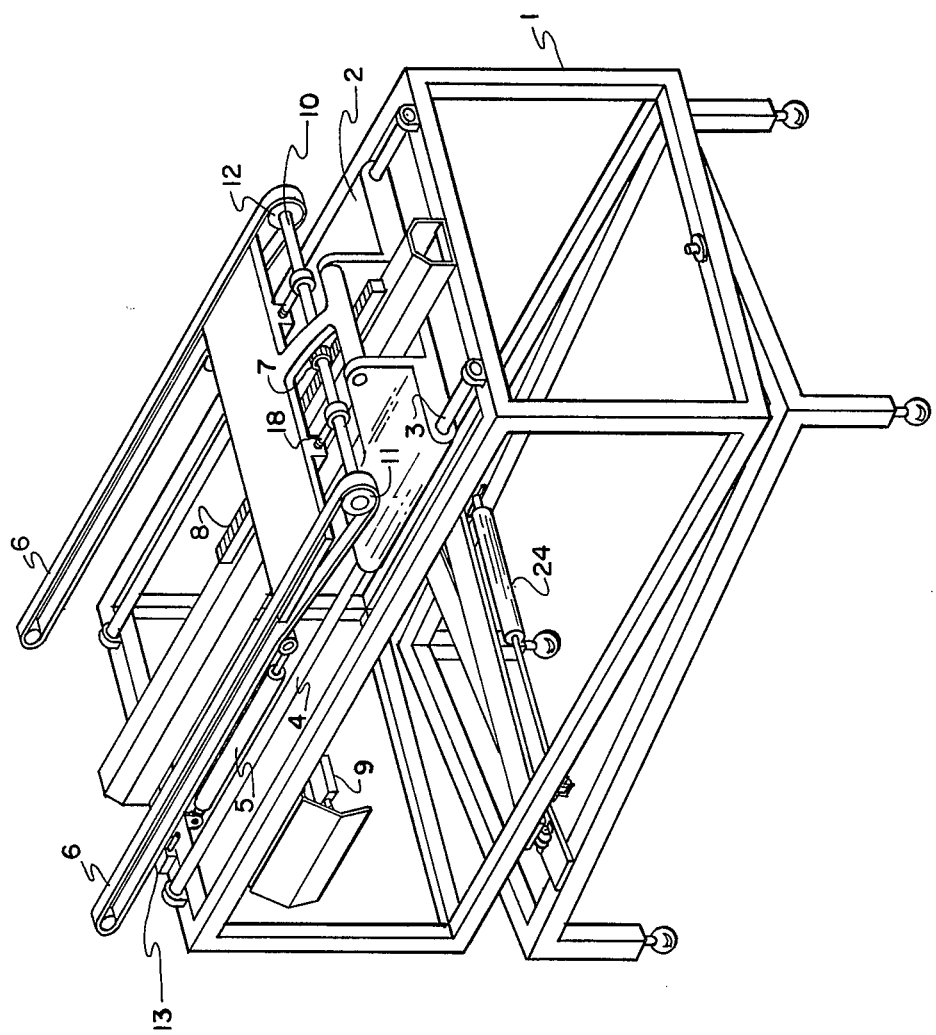
FIG. 1 is an isometric view of the apparatus in accordance with this invention.

FIG. 1 shows the general arrangement of the apparatus of this invention in an isometric view. The apparatus comprises a platform 1 having carriage 2 moveably mounted thereon by follower means 3 threaded on rail 4. The carriage 2 is thus moveable in the direction of article movement along rail 4. This motion is imparted by means 5 for moving the carriage relative to the platform. Such movement producing means is preferably a pneumatic cylinder such as is illustrated on the drawings. However, such movement producing means can be any conventional movement producing means such as an electric motor.

The carriage 2 supports conveying means 6 which is illustrated here as a pair of endless belts. It is understood, however, that other conveying means such as rollers can also be utilized. While the drawing shows a pair of parallel disposed endless belts it is readily apparent that but a single belt or a plurality of endless belts can equally well be utilized with the apparatus of this invention. In its preferred form the apparatus of this invention comprises four endless belts in parallel relationship. This arrangement permits maximum flexibility regarding the relationship between the size of the article being handled and the containers into which the articles are loaded. Thus for loading a smaller container, the container can be arranged such that only one or two of the endless belts enter the container, while retaining the four belts for loading large articles such as primal cuts of beef into larger containers.

The movement of the conveying means is synchronized with the movement of the carriage by means of wheel 7 which is preferably a driven gear riding on a stationary gear rack 8 associated with the platform 1. This synchronization is for the purpose of having the conveying means move the article in the direction of progression at the same time that the carriage moves into a container for the deposit of an article within the container. Other means for synchronizing the two movements could equally well be utilized in the apparatus of this invention, such as independent electric motors and associated timers. Such alternative arrangements are well within the skill of the art.

The apparatus of this invention is set into operation by means of a switch 9 operably connected to the movement producing means 5. The switch 9 is preferably situated as is illustrated for actuation by an operator's knee. Upon actuation of switch 9, the carriage 2 moves in the direction of article progression thus forcing the driven gear 7 to rotate along stationary gear rack 8 so as to cause rotation of common axle 10 which in turn imparts rotation to driven roll 11 and 12 which in turn causes endless belts 6 to move in the desired direction. The velocity with which the article moves on endless belt 6 is determined by the size of the gear 7, size of the drive rolls 11 and 12, and by the velocity of the carriage. It is preferred to establish a conveyor movement which traverses the entire length of the carriage on each cycle such that an article is conveyed off of the carriage on each cycle for deposit in a container at the termination of the cycle. In general a conveyor movement which is about 2½ times the carriage movement is satisfactory for this purpose.

Figure 2:
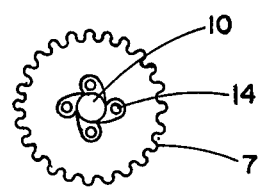
FIG. 2 is a cutaway view of a clutch utilized in the apparatus of this invention.

The apparatus is arranged such that when the carriage reaches the end of its travel in the direction of article progression switch 13 is contacted to cause the movement producing means 5 to return the carriage to its original position. As an optional but preferred feature of the apparatus of this invention driven gear 7 includes clutch-means as is illustrated in FIG. 2 such that the common shaft 10 does not rotate upon the return of the carriage 2 to its original position. By means of the clutch 14 the endless belts only move an article in the direction of article movement. This advantageously allows a non-deposited article to be cycled a second time for deposit within a container without the article returning to the loading end of the carriage. This aspect of the invention is particularly important when the extent of conveyor movement per cycle is less than the entire length of the carriage.

Figure 3:
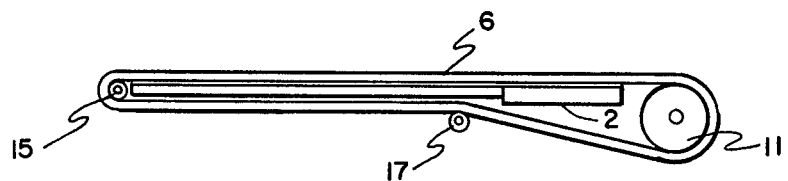
FIG. 3 is a sectional view of the carriage and conveyor means of the apparatus.

The arrangement of the preferred embodiment of this invention wherein the carriage 2 supports endless belts 6 is best illustrated in FIG. 3. The belt 6 is driven by roll 11 and is maintained in tension by idler roll 15. Tension adjusting means 18 are shown in FIG. 1. The tension adjusting means preferably comprise a screw for setting the distance between the common axle 10 and the carriage 2.

The endless belt is preferably composed of a relatively inert material such as neoprene encapsulated polyester cord which is customarily used in a meat handling environment. The structural components of the apparatus are in a like manner, preferably composed of either 303 or 304 stainless steel for use in a meat handling environment. It is understood however that alternative materials could equally well be utilized, particularly where the apparatus is to be utilized in a non-food handling environment.

Figure 4:
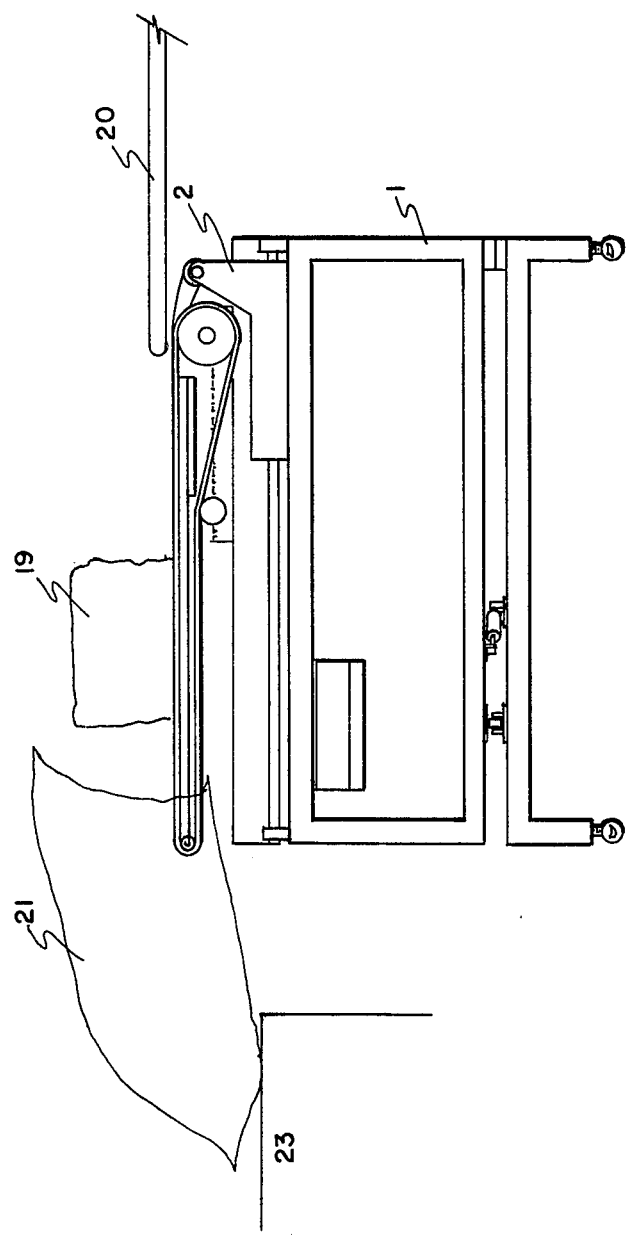
FIG. 4 is a schematic illustration of the apparatus of this invention in the loading mode.
Figure 5:
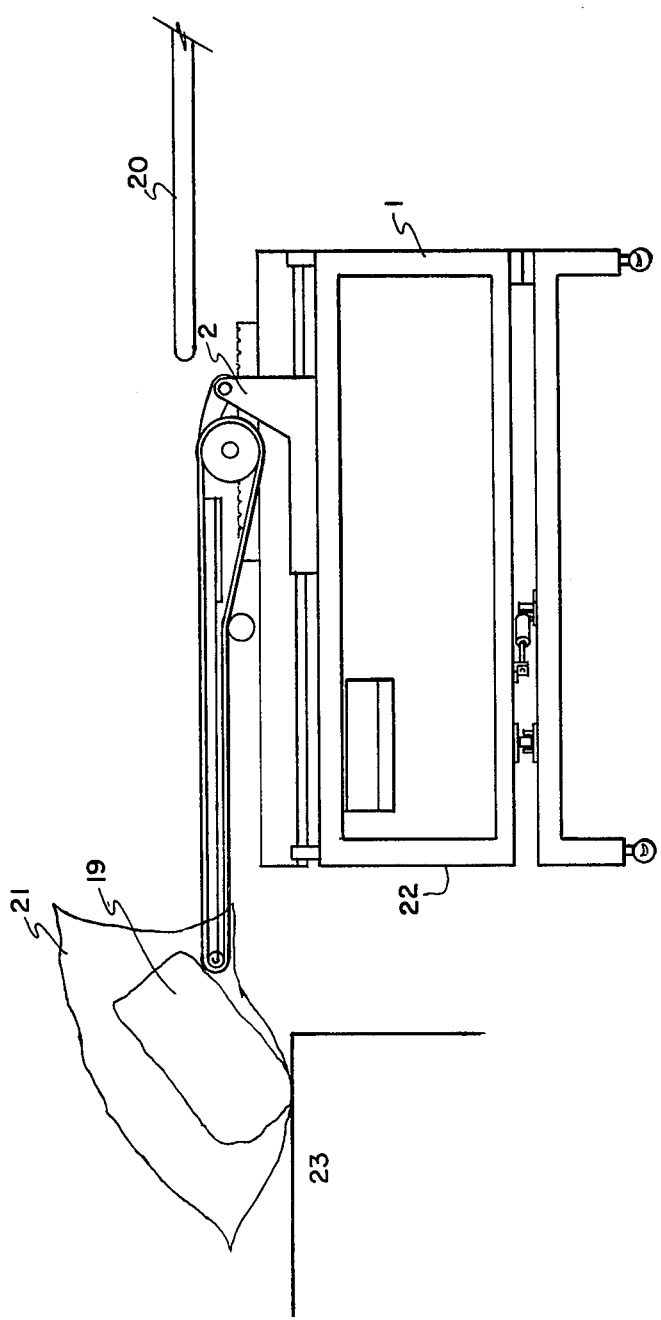
FIG. 5 is a schematic illustration of the apparatus of this invention in the unloading mode.

Having particularly described the apparatus above, the process of its operation is illustrated in FIGS. 4 and 5. The article loading apparatus of this invention is thus adapted to receive an article 19 from a conventional conveyor 20 for movement toward a flexible plastic container 21 which may be resting upon a second conventional conveying means for carriage to further processing steps such as container vacuumization, closure, and shrinkage. Upon actuation by an operator the carriage 2 moves toward the container 21. As is more vividly shown in FIG. 5, the carriage 2 crosses the remote terminous 22 of the platform 1 so as to enter a container 21 for the deposit of the article 19 within the container by the synchronized movement of the endless belt 6.

The apparatus is advantageously operated by draping only two or three inches of a container opening over the end of the conveyors. The movement of the carriage moves the conveyor means into the container and forces the container to open for receipt of the article being carried by the conveyor means. This aspect of the process and apparatus of this invention has unexpectedly been found to overcome the problem of twisted or unusually tacky plastic containers. By virtue of the carriage movement forcing the conveying means into a partially open container, twisted and/or tacky containers are forced open by the entering conveyor means rather than by awkward operator effort.

An additional advantage of the method and apparatus of this invention is that it permits the existence of a gap between the platform 1 and a supporting surface 23 for the loaded containers. This gap is advantageously used for storage of containers for selection and use in the process. By placing a variety of container sizes in this gap, an operator can carry out virtually the entire process without having to shift the area of eye concentration beyond the fringes of the gap between the apparatus and the supporting surface.

As an optional feature the platform 1 is advantageously provided with means 24 for pivoting the top portion of the platform such that the conveying means may be reciprocated between more than one unloading position. In this mode the apparatus of this invention may be utilized to supply two or more packaging operations.

It is thus seen that the apparatus and process of this invention provides a technique whereby articles particularly meat articles can be loaded into flexible containers without manual contact. Various additional features and modifications not disclosed herein will become apparent to those skilled in the art upon a reading of the above disclosure. Such obvious additions and modifications, however, are embodied within the spirit and scope of the following appended claims.

We claim:

1. An apparatus for moving articles in a direction of progression toward and into a container, said apparatus comprising:
    (a) a platform;
    (b) a carriage moveably mounted on said platform, said carriage including a plurality of spaced apart projections;
    (c) conveyor means moveably mounted on said carriage for moving articles in the direction of progression, said conveyor means including a plurality of endless belts supported by said projections;
    (d) means for moving said carriage relative to said platform; and
    (e) means for moving said conveyor means relative to said carriage when said carriage is moved in the direction of progression by said means for moving said carriage, whereby a container may be draped around less than all of said endless belts by being interposed within the spaced apart area.

2. The apparatus according to claim 1 wherein said means for moving said conveyor means comprises a rotatable wheel operably connected to said endless belts and rotatably in contact with said platform whereby said wheel rotates to move said endless belts when said carriage is moved relative to said platform in the direction of progression.

3. The apparatus according to claim 2 wherein said platform comprises a stationary gear rack, and wherein said wheel is a driven gear, and said driven gear engages said gear rack.

4. The apparatus according to claim 3 wherein said driven gear includes clutch means for permitting said endless belt to only convey articles relative to said carriage in the direction of article movement.

5. Apparatus according to claim 1 wherein said platform includes a rail extending in the direction of article movement and said carriage rides on said rail.

6. Apparatus according to claim 2 wherein said carriage comprises a driven roll attached to said wheel, and an idler roll, and wherein said endless belts are operably contacted by said driven roll and engaged by said idler roll whereby said endless belts are extended longitudinally in the direction of progression.

7. The apparatus according to claim 1 wherein the end of said carriage furthermost along said direction of progression is vertically spaced from said platform, whereby an open container may be stationed adjacent said end to receive a portion of said end when said means for moving said carriage functions to move said carriage in the direction of progression.

8. The apparatus according to claim 7 wherein said means for moving said endless belts includes means for synchronizing the movement of said endless belts with the movement of said carriage whereby said endless belts are operable for moving said articles in the direction of progression when said carriage moves in said direction of progression thus causing articles to be conveyed into said container when said carriage is received by said container.

9. The apparatus according to claim 1 wherein said platform extends in the direction of progression from a near terminus to a remote terminus, said remote terminus being further along said direction of progression than said near terminus and wherein said means for moving said carriage is operable for moving said carriage from a first position which is above and between said near terminus and said remote terminus of said platform to a second position wherein the end of said carriage furthermost disposed along said direction of progression is beyond said remote terminus of said platform.

10. The apparatus according to claim 9 further including switch means contacted by said carriage when said carriage is in said second position for causing said means for moving said carriage to return said carriage to said first position.

11. The apparatus according to claim 1 further including means for pivoting the top portion of said platform between two positions.

12. A method for loading articles into containers comprising the steps of:
(a) placing an article upon a conveying means, said conveying means being supported by a moveable carriage;
(b) moving said carriage toward and into a container;
(c) moving said conveyor means in the same direction as and in synchronization with the movement of said carriage so as to cause said article to pass the terminus of said conveyor means to deposit said article within said container; and
(d) retracting said carriage from said container.

* * * * *